(12) United States Patent
Gitthens

(10) Patent No.: US 9,939,093 B2
(45) Date of Patent: Apr. 10, 2018

(54) AUTOMOTIVE COOLANT HOSE CONVERSION ADAPTER

(71) Applicant: James R Gitthens, Edmond, OK (US)

(72) Inventor: James R Gitthens, Edmond, OK (US)

( * ) Notice: Subject to any disclaimer, the term of this patent is extended or adjusted under 35 U.S.C. 154(b) by 200 days.

(21) Appl. No.: 14/998,473

(22) Filed: Jan. 8, 2016

(65) Prior Publication Data

US 2017/0198846 A1 Jul. 13, 2017

(51) Int. Cl.
*F16L 33/22* (2006.01)

(52) U.S. Cl.
CPC .................... *F16L 33/226* (2013.01)

(58) Field of Classification Search
CPC . F16L 19/0212; F16L 19/0218; F16L 33/226; F16L 33/225
See application file for complete search history.

(56) References Cited

U.S. PATENT DOCUMENTS

| 3,764,169 | A | * | 10/1973 | St. Clair | F16L 19/0206 285/321 |
| 4,773,679 | A | | 9/1988 | Hangebrauck | |
| 5,310,227 | A | * | 5/1994 | Grinsteiner | F16L 19/0212 285/234 |
| 5,804,063 | A | | 9/1998 | Creeron | |
| 5,979,868 | A | | 11/1999 | Wu | |
| 6,395,222 | B1 | | 5/2002 | van Meerveld | |
| 6,416,085 | B1 | | 7/2002 | Markovic | |

FOREIGN PATENT DOCUMENTS

| GB | 162167 A | * | 4/1921 | .......... F16L 19/0218 |
| WO | WO 2005043022 A1 | * | 5/2005 | .......... F16L 19/0212 |

* cited by examiner

*Primary Examiner* — Matthieu F Setliff
*Assistant Examiner* — James A Linford
(74) *Attorney, Agent, or Firm* — Randal D. Homburg

(57) ABSTRACT

An adapter assembly fitting an engine coolant system to covert the system to accept a threaded high pressure coolant line in place of the rubber hose, the adapter securing to each coolant line connections, including the upper and lower radiator necks, the necks on the water pumps and the neck generally leading to the intake manifold. These adaptors connect to each neck, allowing for further connection to the high pressure threaded hoses used in high compression engines or for those automobile owners who wish to upgrade to a more aesthetic appearance of the engine compartment. The adaptor assembly comprises a circular composite band, a body having a fluid channel, a split ring washer and a compression ring which attach to each neck in a manner to seal the adapter to the neck.

4 Claims, 4 Drawing Sheets

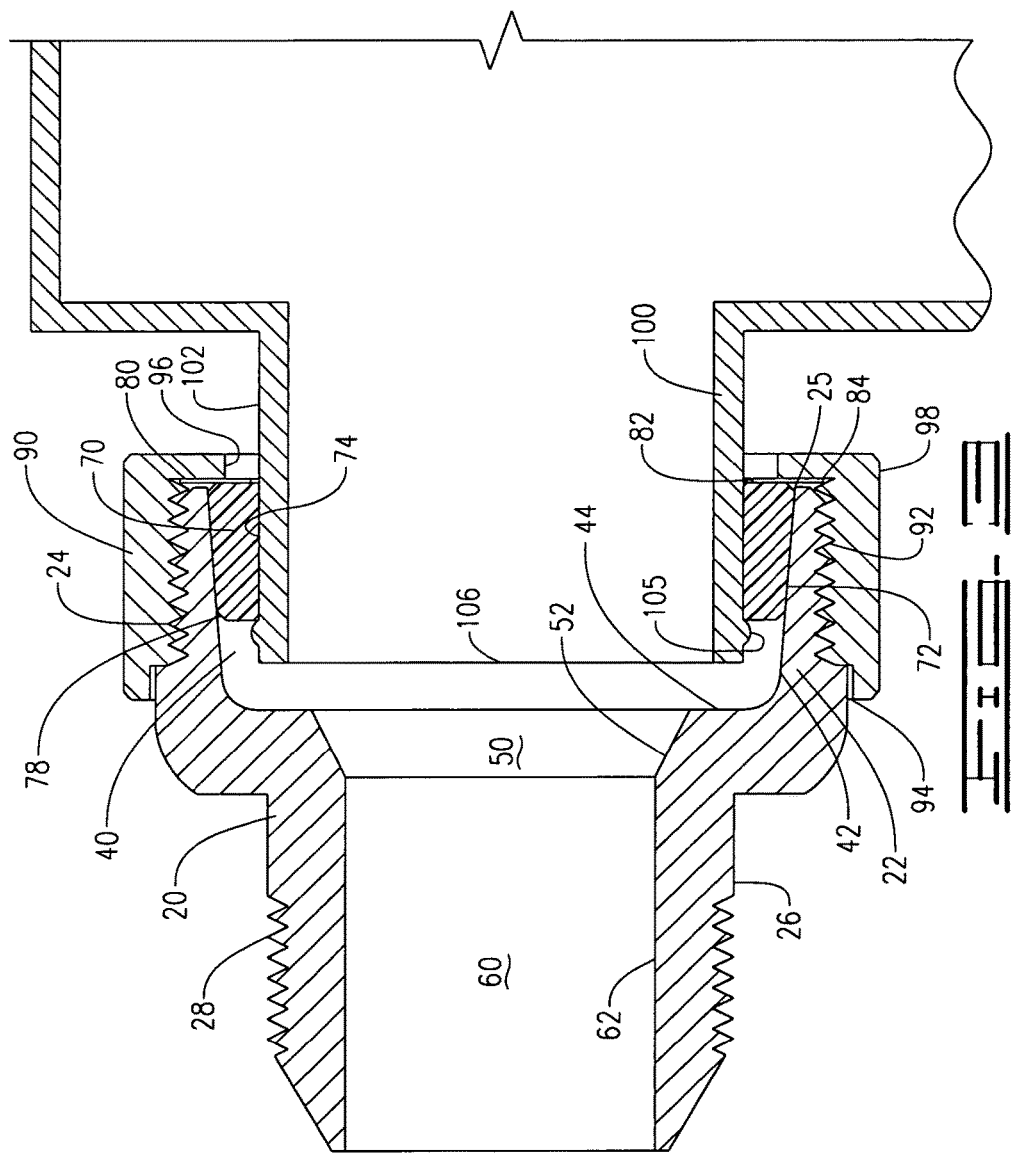

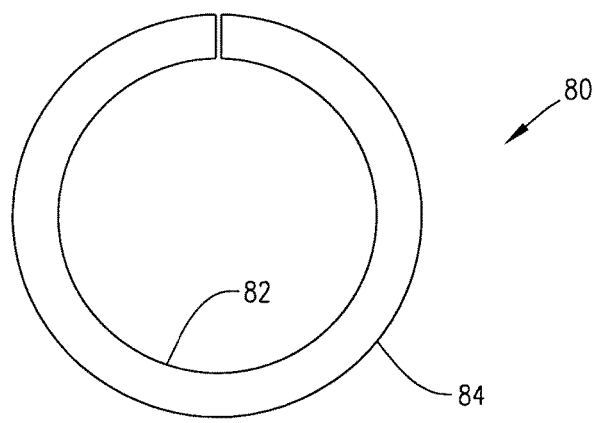
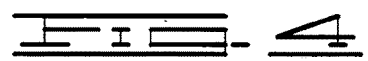
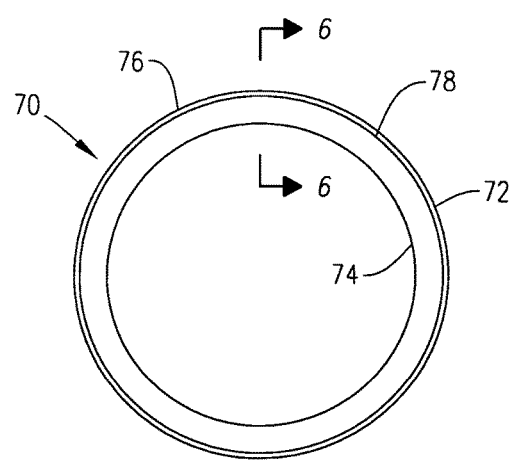
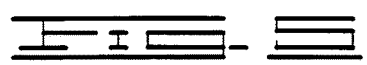
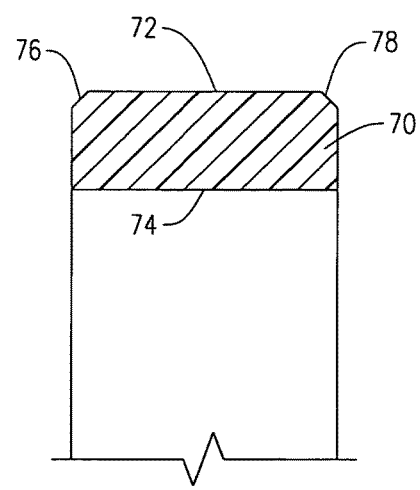
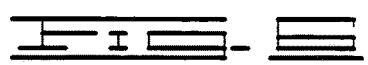

AUTOMOTIVE COOLANT HOSE CONVERSION ADAPTER

CROSS REFERENCE TO RELATED APPLICATIONS

None.

I. BACKGROUND OF THE INVENTION

1. Field of Invention

An adapter assembly fitting an engine coolant system to covert the system to accept a threaded high pressure coolant line in place of the rubber hose, the adapter securing to each coolant line connections, including the upper and lower radiator necks, the necks on the water pumps and the neck generally leading to the intake manifold. These adaptors connect to each neck, allowing for further connection to the high pressure threaded hoses used in high compression engines or for those automobile owners who wish to upgrade to a more aesthetic appearance of the engine compartment. The adaptor assembly comprises a circular composite band , a body having a fluid channel, a split ring washer and a compression ring which attach to each neck in a manner to seal the adapter to the neck.

2. Description of Prior Art

A preliminary review of prior art patents was conducted by the applicant which reveal prior art patents in a similar field or having similar use. However, the prior art inventions do not disclose the same or similar elements as the present coolant system hose adapter, nor do they present the material components in a manner contemplated or anticipated in the prior art.

No adapter suited for the conversion of coolant system necks were found in the search for prior art. However pressure fitting for hoses were located as disclosed herein. In U.S. Pat. No. 4,773,679 to Hangebrauck, a compression coupling includes a metal tube having circumferentially extended beads formed for receiving a free end of a flexible tube held in place by a clamping mechanism. There is no threaded engagement nor is there an elastic circular composite band. A quick connect attachment is disclosed in U.S. Pat. No. 5,979,868 to Wu, which allows for the introduction of a quick connect coupling into a fluid line. It uses a combination of threaded engagements, O-ring seals, ball joints and springs, but has little if any to do with the present coolant system neck adapter in function or substantially equivalent elements. A pressurized hose coupling is shown in U. S. Pat. No. 6,416,085 to Markovic, which is also not adapter nor designed to attach to a coolant system neck as disclosed in the present adapter. Unlike the present adapter which attaches to a neck and provides for the attachment of a threaded pressurized hose end, the Markovic patent involves the attachment end of the hose. It has no component structure adapted to fit upon the coolant system neck as does the present adapter, and is thus also not suited for use as is the present adapter, nor does it provide elements substantially similar or equal to those elements and structural relationship as the present adapter.

II. SUMMARY OF THE INVENTION

Factory coolant systems for automobiles are applied to an engine to maintain a temperature of the engine within acceptable limits and also to provide a source of heat for conditioning the air within the driver's compartment. The primary components of this system include a radiator having an upper neck connected by radiator hoses to a thermostat and housing which lead to the internal engine to transfer the operation heat from the engine to the circulating fluids within the system, a water pump to circulate the coolant fluids attached to the engine by a hose, further providing a hose connected to the radiator to return the hot fluids to the radiator where the fluids are cooled by a cooling fan. The two primary radiator hoses a provided as a rubber reenforced hose which is overall somewhat rigid and shaped to conform to the appropriate directional bending suited for the engine with which the hoses are used. These neck connections provided by the radiator, housing, and water pump are cylindrical extensions having a raised circular expansion near the end, which, in combination with a hose clamp, secures the rubber hose upon the neck.

The purpose of the present adapter is to allow conversion of the hoses to a threaded high pressure hose that attaches the threaded hose to the existing necks without a need to modify the necks with a threaded replacement. The adaptors secure to the existing necks and present an externally threaded end to which the threaded end hoses are attached. The adapter and its components enable for an increase in coolant circulation pressure, which may be useful in modified racing engines provided a water pump replacement also incurs to increase such coolant pressure, as well as possible other upgrades. In other instance, an automobile owner may simply want to use this adaptor and threaded hose combination to improve the aesthetic appearance of the engine compartment, the replacement threaded hoses often supplied with metallic or chrome sleeves which are though to improve the appearance of the engine compartment to some owners or for show cars.

These are especially prominent in restorations and display vehicles which compete for aesthetic looks and novelty.

III. DESCRIPTION OF THE DRAWINGS

The following drawings are submitted with this utility patent application.

FIG. 3 is a cross sectional view of the hose adapter secured to the hose neck.

FIG. 4 is a top view of the split ring washer of the hose adapter.

FIG. 5 is a top view of the composite compression ring.

FIG. 6 is a sectional view of the composite compression ring along sectional lines 6/6 of FIG. 5.

IV. DESCRIPTION OF THE PREFERRED EMBODIMENT

Figure 1:
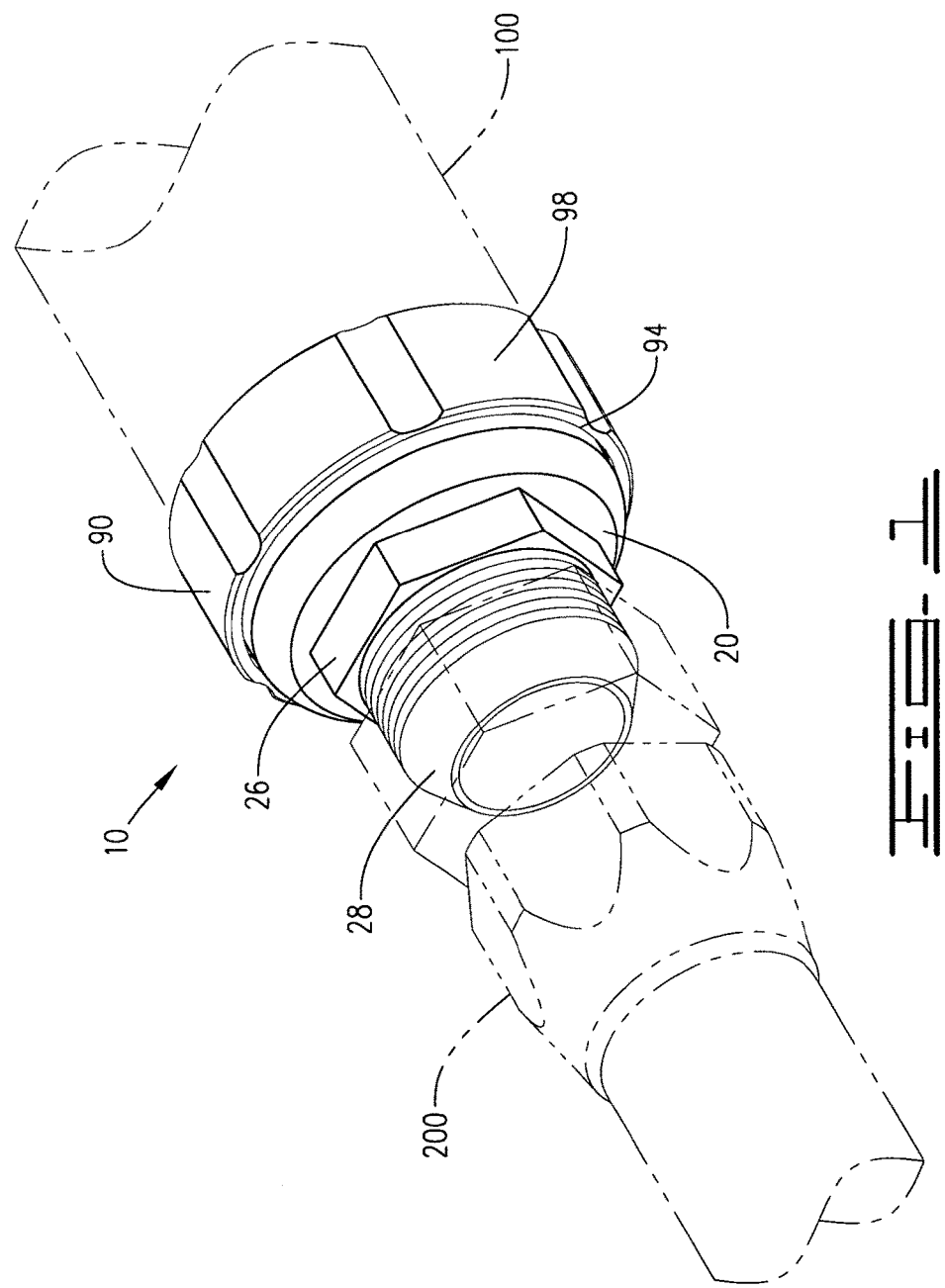
FIG. 1 is a perspective view of the hose adapter with a phantom line indicating the hose neck to which the adapter attaches and a phantom line indicating a threaded hose connected to the adapter.
Figure 2:
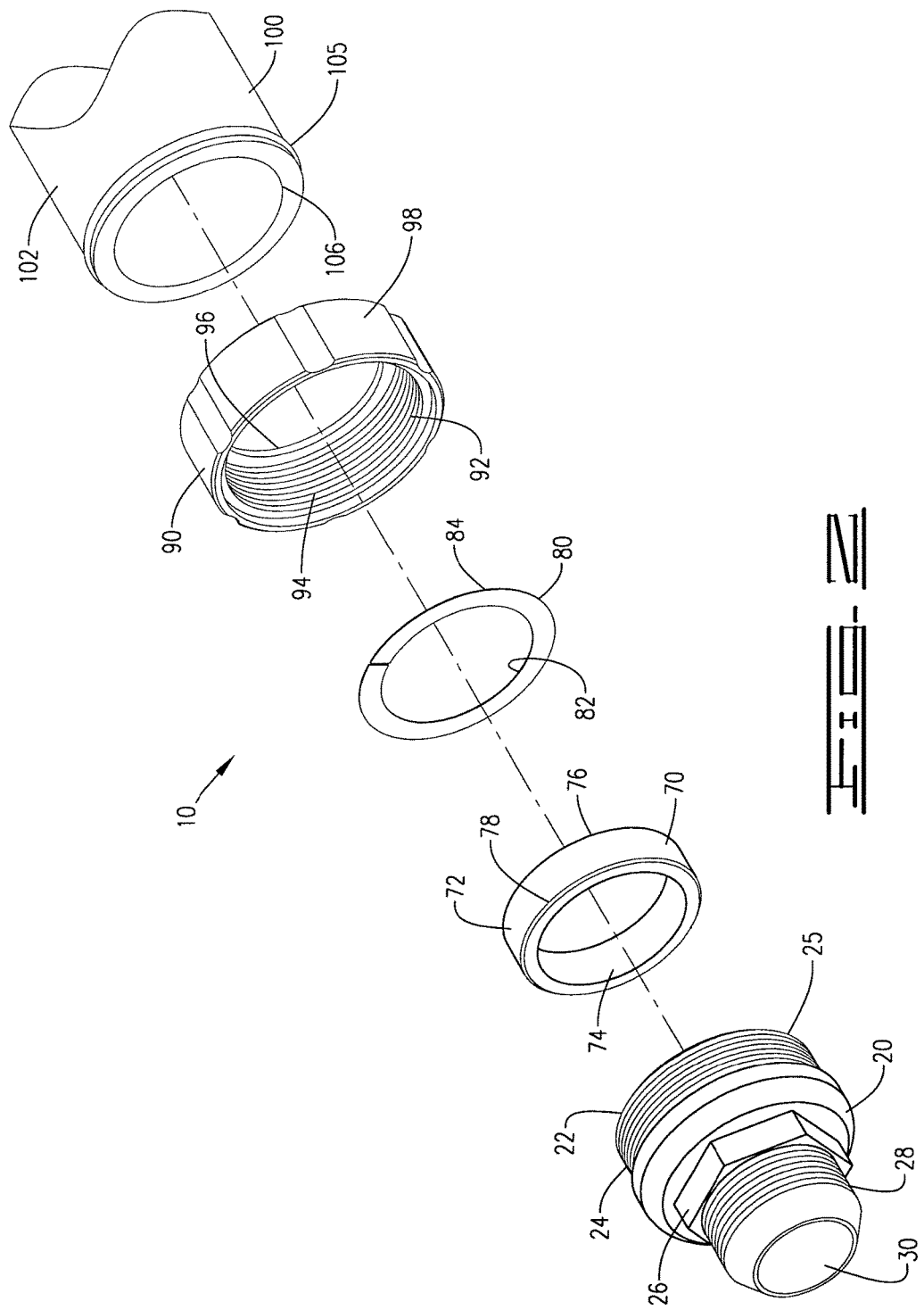
FIG. 2 is an exploded view of the components of the hose adapter and a representative hose neck.

A hose adapter assembly 10 for an engine coolant circulating system, converting a hose neck 100 having an elevated circular ridge 105 upon an outer surface 102 of the hose neck 100, the adapter assembly 10 providing a connection for a threaded coolant hose 200 in place of a rubber coolant hose, comprises a body 20, FIGS. 1-3, having an outer threads 24 on a hose neck fitting 22 defining a hose neck cavity 40, an outer wrench margin 26, and an outer threaded hose connection fitting 28 with a fluid channel 30 extending from the hose neck cavity 40 through the hose connection fitting 28, an elastic circular composite band 70, FIGS. 2-3 and 5-6, defining an outer surface 72 and an internal surface 74 of a circumference which can be expanded for placement over the elevated circular ridge 105 of the hose neck 100 and further retracted to a fluid sealed contact with the outer surface 102 of the hose neck 100, a split ring washer 80, FIGS. 2-4, and a compression ring 90, FIGS. 1-3, providing an internal threaded margin 92 within an internal cavity 94 with a reduced perimeter end 96 having a circumference for placement over the elevated circular ridge 105 of the hose neck 100, the compression ring 90 further defining an outer perimeter surface 98 to rotate and install the compression ring 90 during assembly, the compression ring 90 threadably engaging the outer threads 24 of the hose neck fitting 22 of the body 20, FIG. 3. As seen in FIG. 2, the adapter assembly 10 provides for the attachment to the hose neck 100 by placement of the compression ring 90 upon the hose neck 100 past the elevated circular ridge 105 with the internal cavity 94 presented outward, placement of the split ring washer 80 within the internal cavity 94 against the reduced perimeter end 96 of the compression ring 90, placement of the circular composite band 70 onto the outer surface 102 beyond the elevated ridge 105 of the hose neck 100, and engaging the outer threads 24 of the hose neck fitting 22 within the internal threaded margin 92 of the internal cavity 94 of the compression ring 90, wherein the composite band 70 is compressed within the hose neck cavity 40 by the forced pressure applied by the split ring washer 80 within the internal cavity 94 of the compression ring 90, creating a pressurized seal to prevent any coolant leak from the automobile coolant system flowing from the adapter assembly 10 other than an intended passage through the fluid channel 30 from the threaded hose connector fitting 28. As seen in FIG. 1, the presenting extension from the hose adapter assembly 10 is the fluid channel 30 from the threaded hose connection fitting 28 accepting the threaded coolant hose 200, thereby replacing a rubber hose which would otherwise connect to the hose neck 100 by some type of hose clamp or other means disclosed in the know prior art.

Further definition of the hose neck 100 to which the hose adapter assembly 10 is demonstrated in FIGS. 2-3, and known in the prior art, as a generally cylindrical extension of uniform diameter with the elevated circular ridge 105 near a hose neck opening 106. These are generally incorporated within the liquid coolant circulating system of an automobile. These hose necks 100 are commonly supplied on the radiator at one or more locations, the engine housing most often within or near the intake manifold, and upon the water pump which, in combination with a hose clamp, secures a rubber hose upon the hose neck 100, the hose extending past the elevated circular edge and held secure by the tightened hose clamp. The hose adapter assembly 10 may be provided to fit the various sizes which might occur on a variety of sized hose necks 100 on a variety of automobiles and engines.

The body 20, shown in FIG. 3, further comprises the fluid channel 30 defining the hose neck cavity 40 providing a narrowing tapered surface 42 from an outer end 25 to an inner shoulder 44, a reduction section 50 also having a narrowing tapered surface 52, and a hose connection section 60 defining a uniform cylindrical surface 62. The composite band 70, FIGS. 2 and 5-6, further defines an upper edge 76 of the outer surface 72, at least one upper edge 76 having a taper 78, FIG. 6. This composite band 70 is made of an elastic polymer, plastic, rubber, or other material which is compressible, expandable, and resistant to the circulating coolant fluids of the engine coolant system. As shown in FIG. 3, the composite band 70, after being installed over the elevated circular ring 105 of the hose neck 100, is squeezed between the split ring washer 80 within the compression ring 90 and the hose neck fitting 22 inside the narrowing tapered surface 42 of the hose neck cavity 40, forming a tight seal to prevent leakage of any circulating fluids where the body 20 and compression ring 90 attach, the compression controlled by the tension and threaded engagement between the body 20 and the compression ring 90, the pressure applied to the composite band 70 proportional to the engagement of the outer threads 24 of the body 20 and the internal threaded margin 92 of the compression ring 90 attached to one another.

The split ring washer 80, FIGS. 2-4, further defines an inner diameter 82 greater than or equal to the outer surface of the hose neck 100 to which it is installed and an outer diameter 84 fitting within the internal cavity 94 of the compression ring 90 while greater than the diameter of said reduced perimeter end. It is installed over the elevated circular ridge 105 of the hose neck 100 prior to the installation of the composite band 70 and subsequent to the placement of the compression ring 90 upon the hose neck 100. The split ring washer 80 is sandwiched between the reduced perimeter end 96 of the compression ring 90 and the installed composite band 70, as shown in FIG. 3.

As seen in FIG. 3, the intended attachment of the hose adapter assembly 10 to the hose neck 100 demonstrates that the assembly 10 provides a fluid sealed extension to the hose neck 100 to provide for attachment of the threaded coolant hose 200, without requiring modification to the existing coolant system. In the past, threaded hoses required the removal of the hose neck 100 and replacement of the factory hose neck 100 with a threaded neck. This was a permanent modification, which would not allow for the reapplication of a rubber hose at a later date. It was an expensive conversion and required the skill of a welder or someone capable of brazing the outer threaded hose neck into each component of the circulating system, which could require the removal and installation of at least four hose necks 100. The current hose adapter assembly 10 may be installed by anyone with a wrench and having the skill to use it. The application of the adapter 10 provides utility for acceptance of pressurized threaded circulating hoses 200 used in high compression and high rpm engines, or for the application of threaded circulating hoses 200 which are simply more aesthetically appealing than standard rubber hoses, and in show cars or those classic cars which are restoration projects.

While the hose adapter assembly 10 has been particularly shown and described with reference to a preferred embodiment thereof, it will be understood by those skilled in the art that changes in form and detail may be made therein without departing from the spirit and scope of the invention.

What is claimed is:

1. An automotive coolant hose conversion adapter securing to one or more engine coolant system hose necks, each said engine coolant system hose neck defining a hose neck opening, an outer surface with an elevated circular ridge, said automotive coolant hose conversion adapter providing for replacement of a factory supplied rubber coolant hose and hose clamp with a threaded coolant hose, said automotive coolant hose conversion adapter comprising:

a body having outer threads on a hose neck fitting defining a hose neck cavity, an outer wrench margin, an outer threaded hose connection fitting and a fluid channel extending from said hose neck cavity through said hose connection fitting;

an elastic circular composite band defining an outer surface and an internal surface having a circumference which can be expanded for placement over said elevated circular ridge of said hose neck and further retracted, forming a fluid sealed contact with said outer surface of said hose neck;

a split ring washer; and a compression ring defining an internal threaded margin within an internal cavity, a reduced perimeter end having a circumference larger than said elevated circular ridge of said hose neck, and an outer perimeter surface, said internal threaded margin of said compression ring threadably engaging said outer threads of said hose neck fitting of said body, said conversion adapter attaching to said hose neck by placement of said compression ring upon said hose neck behind said elevated circular ridge with said internal cavity presented outward, placement of said split ring washer against said reduced perimeter end of said compression ring, placement of said circular composite band onto said outer surface of said hose neck behind and in abutment with said elevated circular ridge, and securing said outer threads of said hose neck fitting within said internal threaded margin of said internal cavity of said compression ring, compressing said composite band while creating a pressurized seal to prevent any coolant leak flowing through said fluid channel of said body into or out of said hose neck while presenting said threaded hose connector fitting for attachment to said threaded coolant hose.

2. The automotive coolant hose conversion adapter of claim 1, said fluid channel further comprising:

said hose neck cavity having a narrowing tapered surface from an outer end of said body to an inner shoulder, a reduction section also having a narrowing tapered surface, and a hose connection section defining a uniform cylindrical surface.

3. The automotive coolant hose conversion adapter of claim 1, said composite band further comprising:

an upper edge of said outer surface defining a taper, said composite band formed of a material from a list consisting of an elastic polymer, plastic, rubber, or other material which is compressible, expandable, and resistant to the circulating coolant fluids of the engine coolant system, wherein said composite band, after being installed over said elevated circular ring of said hose neck, is compressed between said split ring washer within the compression ring and the hose neck fitting inside a narrowing tapered surface of said hose neck cavity, forming a tight seal to prevent leakage of any circulating fluids where said body and said compression ring attach, the compression controlled by the tension and threaded engagement between said body and said compression ring, said pressure applied to said composite band proportional to an amount of engagement of said outer threads of said body and said internal threaded margin of said compression ring.

4. The automotive coolant hose conversion adapter of claim 1, further comprising:

said split ring washer defining an inner diameter greater than or equal to said outer surface of said hose neck and an outer diameter fitting within said internal cavity of said compression ring and greater than the diameter of said reduced perimeter end, said split ring further installed over said elevated circular ridge of said hose neck prior to the installation of said composite band and subsequent to the placement of said compression ring upon said hose neck, said split ring washer located between said reduced perimeter end of said compression ring and said composite band during assembly and attachment to said hose neck.

* * * * *